United States Patent [19]

Berkey

[11] Patent Number: 4,486,212
[45] Date of Patent: Dec. 4, 1984

[54] DEVITRIFICATION RESISTANT FLAME HYDROLYSIS PROCESS

[75] Inventor: George E. Berkey, Corning, N.Y.
[73] Assignee: Corning Glass Works, Corning, N.Y.
[21] Appl. No.: 427,525
[22] Filed: Sep. 29, 1982
[51] Int. Cl.$^3$ .............................. C03B 37/025
[52] U.S. Cl. ............................ 65/2; 65/3.12
[58] Field of Search .............. 65/3.11, 3.12, 18.2, 65/32; 350/96.30, 96.33

[56] References Cited

U.S. PATENT DOCUMENTS

| | | | |
|---|---|---|---|
| 3,775,075 | 11/1973 | Keck et al. | 65/3.12 |
| 3,826,560 | 7/1974 | Schultz | 65/3.12 X |
| 3,877,912 | 4/1975 | Shirarshi et al. | 65/3.11 |
| 4,125,388 | 11/1978 | Powers | 65/3.12 |
| 4,204,851 | 5/1980 | Nolan | 65/3.12 |
| 4,251,251 | 2/1981 | Blankenship | 65/3.12 |
| 4,289,522 | 9/1981 | Bailey et al. | 65/144 |
| 4,298,365 | 11/1981 | Bailey et al. | 65/3.12 |

Primary Examiner—S. Leon Bashore
Assistant Examiner—Michael K. Boyer
Attorney, Agent, or Firm—W. J. Simmons, Jr.; W. S. Zebrowski

[57] ABSTRACT

Porous glass optical fiber preforms are conventionally formed by depositing many layers of glass soot on a mandrel, removing the mandrel, and heating the porous preform to form a consolidated glass article. To prevent the formation of a devitrified layer at the aperture-forming surface during the consolidation step, the rate of soot deposition is initially reduced so that a stratum of fine soot is initially deposited on the mandrel. The stratum is initially discontinuous, but after a plurality passes of the soot-producing burner, it becomes continuous. Thereafter, the formation of the remainder of the soot preform continues in a conventional manner.

13 Claims, 12 Drawing Figures

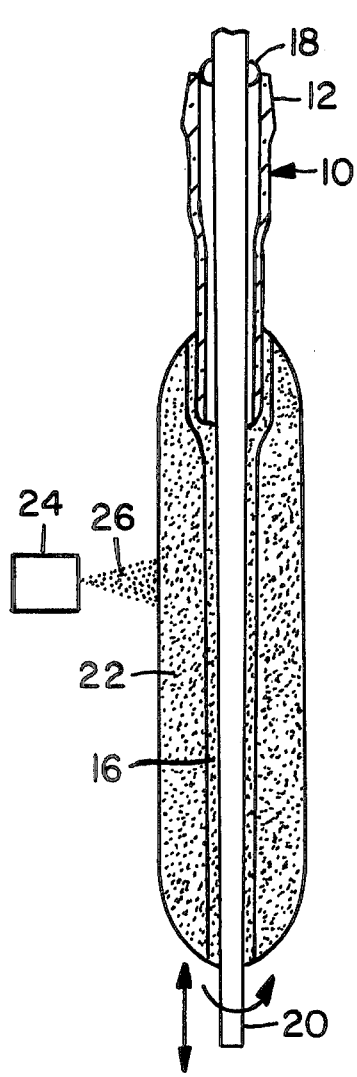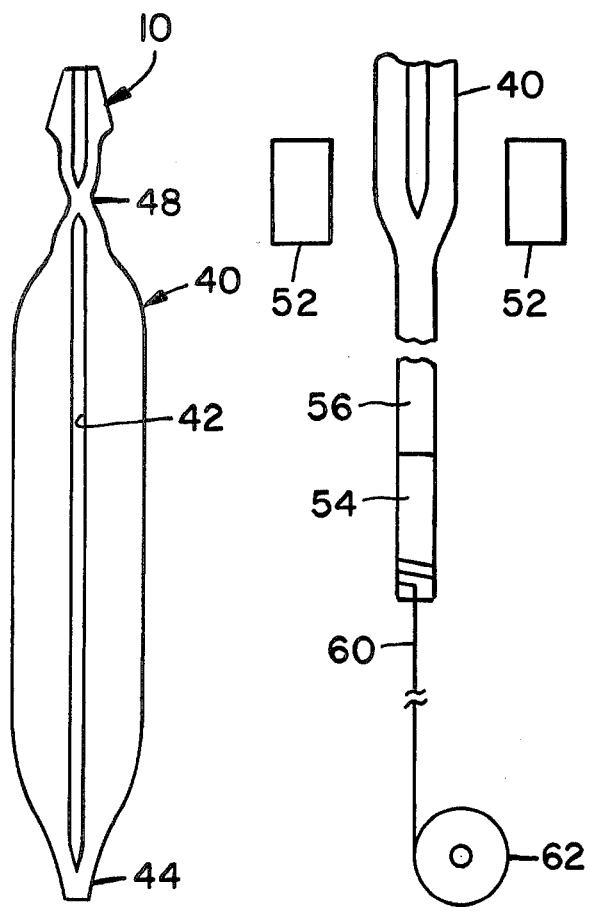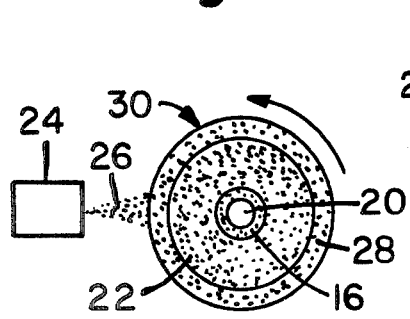
Fig. 1
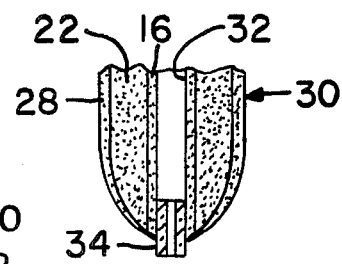
Fig. 3
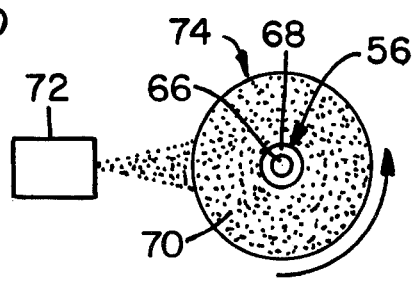
Fig. 2
Fig. 6

DEVITRIFICATION RESISTANT FLAME HYDROLYSIS PROCESS

CROSS-REFERENCE TO RELATED APPLICATION

The present invention is related to the invention disclosed in my copending application Ser. No. 402,056 entitled "Method of Making Glass Preform and Optical Fiber" filed on July 26, 1982.

BACKGROUND OF THE INVENTION

The present invention relates to an improved method of forming a soot preform from which optical waveguide fibers can be made.

Certain glass making processes, particularly vapor deposition processes, have been commonly employed in the formation of optical waveguide blanks. In one such process, referred to as the flame hydrolysis or outside vapor deposition process, a plurality of constituents in vapor form are entrained in a gaseous medium in predetermined amounts and thereafter are oxidized in a flame to form particulate matter called soot. A first soot coating of uniform or radially varying composition is applied to the surface of a rotating cylindrical mandrel or starting member. After the first coating of soot is deposited to form the core glass, the composition of the soot is changed to form a cladding glass coating. Heretofore, the mandrel was usually removed, and the soot preform was sintered to form a consolidated, clear glass draw blank having an aperture therethrough. Acid was flowed through the aperture to etch defects from the aperture forming surface. The resultant tubular draw blank was heated to a temperature at which the material had a low enough viscosity for drawing and was drawn to collapse the hole therein and form a fiber having the desired dimensions. Various methods employing such a flame hydrolysis technique for forming glass optical waveguide fibers are taught in U.S. Pat. Nos. Re. 28,029; 3,711,262; 3,737,293; 3,823,995 and 3,826,560, the latter two patents being directed to the formation of gradient index waveguides.

The following problems have been encountered when practicing the method wherein the consolidated draw blank was formed with a longitudinal aperture caused by removal of the mandrel. Because of the dopants added to the core region of the blank to increase the refractive index thereof, the coefficient of expansion of that region is greater than that of the cladding region. Thus, when the blank cools after the consolidation process, the central or core region is put into a state of tension. The aperture in the center of the blank, which has remained after removal of the mandrel, presents a free surface in the region of high tensile force where breaks are readily initiated. Also, the rate of drawing a fiber from a preform having an aperture is limited by the rate at which the aperture will close during the drawing process. Moreover, the surface of an open preform aperture can become contaminated, especially during the high temperature fiber drawing operation.

A solution to the aforementioned problems is disclosed in U.S. Pat. No. 4,251,251 (Blankenship) wherein the preform aperture closes during consolidation due to the predetermined relative viscosities of the core and cladding materials. The Blankenship patent teaches that care must be taken to minimize damage done to the preform while removing the mandrel since such damage can result in the formation of seeds at the center of the resultant consolidated draw blank. Damage to the aperture surface is especially troublesome in the practice of that method since defects cannot be etched from that surface after consolidation, the aperture having been closed during that step. Damage to the aperture surface can be reduced by forming a soft parting layer of carbon soot on the surface of the mandrel and thereafter building up the preform with glass soot.

U.S. Pat. No. 4,298,365 teaches a method which further facilitates the closing of the soot preform aperture during consolidation. A thin stratum of very low viscosity glass soot is initially applied to the surface of a mandrel. First and second coatings of glass soot are then deposited on the surface of the thin stratum in accordance with the teachings of the aforementioned Blankenship patent. The mandrel is removed, and the soot preform is subjected to a high temperature whereby it is consolidated to form a dense glass blank. The glass surface tension and the relative viscosities of the inner and outer portions of the preform cause the aperture to close during the consolidation process. The thin stratum, which may include $P_2O_5$ or $B_2O_3$ smoothes over the damage caused by removing the mandrel and reduces or even eliminates seed formation at the axis of the resultant glass blank.

However, the use of $P_2O_5$ or $B_2O_3$ to facilitate hole closing is detrimental to achieving ultra low loss attenuation at long wavelengths. Fibers having cores that are free from $P_2O_5$ or $B_2O_3$, eg. fibers having cores consisting of $GeO_2$-doped silica, are preferred for low-loss operation in the infrared region of the spectrum. The aperture in a preform having a $GeO_2$-$SiO_2$ core region does not close during consolidation.

In my copending application Ser. No. 402,056 entitled "Method of Making Glass Preform and Optical Fiber" filed on July 26, 1982, there is disclosed a process whereby a porous preform formed by the flame hydrolysis process is heated to form an elongated, consolidated glass preform having an aperture therethrough. One end of the aperture is closed, the aperture is evacuated and the other end is then closed. The resultant article can be handled or stored without risk of contaminating the aperture forming walls.

In accordance with one embodiment of the method of my copending application a layer of low expansion silica soot is initially formed on the mandrel so that, upon consolidation of the soot preform, the aperture forming surface is in compression, thus reducing the tendency for cracks to initiate at that surface. However, the surface of the pure silica layer adjacent the mandrel readily devitrified during consolidation. The devitrified surface portion of the silica layer had to be removed by etching to prevent the formation of seeds in the resultant fiber. Since one end of the preform aperture closed during consolidation, that end had to be severed to permit the acid wash to flow freely through the aperture in order to effectively remove the devitrified layer. The additional process steps of severing and etching increase the cost of producing optical fibers.

SUMMARY OF THE INVENTION

It is therefore an object of the present invention to provide an improved method of depositing on a mandrel a glass particulate material that would have had a tendency to devitrify during consolidation under ordinary process conditions. Another object is to provide a method of preventing the contamination of the aperture-forming wall of a consolidated optical fiber preform. A further object is to provide an improved method of forming an aperture-containing optical fiber soot preform formed of core and cladding materials the viscosities of which prevent closure of the aperture during the consolidation process. Another object is to provide an improved method of forming an optical fiber by a technique which requires the deposition of particulate material on the surface of a mandrel.

Briefly, the present invention relates to a method of forming a high purity glass article. Such a method conventionally comprises the steps of rotating a substantially cylindrical mandrel, directing a stream of glass particles toward the mandrel, and reciprocatingly moving the stream longitudinally with respect to the mandrel. The combination of the rotation of the mandrel and the reciprocating movement of the stream with respect to the mandrel causes the stream to impinge upon the mandrel along a spiral path. Continued deposition of the particles causes a coating of uniform thickness to be built up on the mandrel. The mandrel is removed to form a tubular porous glass preform which is consolidated to form a tubular glass article. The improvement of the present invention comprises depositing the first plurality of layers of glass particles on the surface of the mandrel at a deposition rate that is sufficiently low that no spiral pattern of deposited glass particles is visible, whereby there is formed by the consolidation process a tubular glass article, the aperture-forming surface of which is free from devitrification.

To form an optical waveguide fiber from the consolidated glass preform, it may be directly drawn into an optical fiber, or it may be drawn into a large diameter intermediate fiber upon which additional cladding material may be added. In either process, the low pressure within the preform aperture with respect to that on the outer surface thereof assists the aperture closing process.

BRIEF DESCRIPTION OF THE DRAWINGS

FIGS. 1 and 2 illustrate the application of successive coatings of glass soot to a mandrel.

FIG. 3 is a fragmentary cross-sectional view of the end of a porous preform prior to the consolidation process.

FIG. 4 is a cross-sectional view of a consolidated glass preform after the aperture has been evacuated and closed at both ends.

FIG. 5 is a schematic diagram illustrating the drawing of a rod from the preform.

FIG. 6 illustrates the application of a coating of glass cladding soot to an intermediate fiber.

DESCRIPTION OF THE PREFERRED EMBODIMENT

Figure 7:
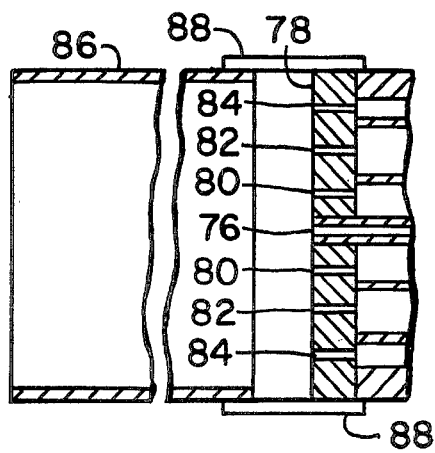
FIG. 7 is a fragmentary cross-sectional view of a conventional flame hydrolysis burner.

It is to be noted that the drawings are illustrative and symbolic of the invention, and there is no intention to indicate scale or relative proportions of the elements shown therein. Further, it is to be noted that the present invention expressly contemplates both single mode and multimode waveguides regardless of any specific description, drawing, or example set out herein. The present invention also contemplates optical waveguides having cores with either a constant or gradient index of refraction. In the case of gradient index optical waveguides the cladding may be the outer portion of the core, or it may be a layer whose refractive index is lower than that of the adjacent core material by such an amount that there is an abrupt change in refractive index at the core-cladding interface.

A porous preform may be formed in accordance with the method illustrated in FIGS. 1 and 2. A handle 10 of the type disclosed in U.S. Pat. No. 4,289,522 may be employed. Handle 10 is a tubular member having a ground glass joint 12 at the one end thereof. The large diameter end of a tapered mandrel 20 extends through handle 10 and is secured thereto by shims 18. The ends of the mandrel are mounted in a lathe where it is rotated and translated as indicated by the arrows. The mandrel may be provided with a layer of carbon soot to facilitate removal of the soot preform.

Fuel gas and oxygen or air are supplied to burner 24 from a source (not shown). This mixture is burned to produce a flame which is emitted from the burner. A gasvapor mixture is oxidized within flame to form a soot stream 26 which is directed toward mandrel 20. Suitable means for delivering the gas-vapor mixture to the burner are well known in the art; for an illustration of such means reference is made to U.S. Pat. Nos. 3,826,560, 4,148,621 and 4,173,305. One or more auxilliary burners (not shown) may be employed to direct a flame toward one or both ends of the soot preform during deposition to prevent breakage. This method can be employed to produce any type of core index profile including step index and gradient index. For an illustration of suitable burners, reference is made to U.S. Pat. Nos. 3,565,345 and 4,165,223. Soot deposition means 24 may also comprise nozzles such as those disclosed in U.S. Pat. No. 3,957,474 which emit reactant vapors which are heated by means such as a laser beam to form a soot stream.

A fragmentary cross-sectional view of a conventional flame hydrolysis burner which may be employed as deposition means 24 is illustrated in FIG. 7. A centrally located orifice 76 in burner face 78 is surrounded by concentric rings of orifices 80, 82 and 84. The reactant compounds emanate from orifice 76 where they are subjected to heat from a flame produced by the fuel gas and oxygen emanating from orifices 82. A stream of oxygen, referred to as the inner shield, emanates from orifices 80; this stream prevents reaction of the reactant compounds at the burner face. Finally, a stream of oxygen referred to as the outer shield emanates from orifices 84. This burner design is somewhat similar to that disclosed in U.S. Pat. No. 3,698,936 issued to H. J. Moltzan, the Moltzan patent differeing in that it teaches an annular slot for providing the inner shield and in that it lacks the outer shield orifices. All of the orifices of the burner are supplied by manifolds in a manner similar to that taught in the Moltzan patent.

The burner is generally operated under conditions that will provide acceptably high laydown rates and efficiency while minimizing the buildup of soot on face 78. Under such conditions, the flow rates of gases and reactants from orifices 76, 80, 82 and 84 and the sizes and locations of such orifices as well as the axial orientation thereof are such that a well focused stream of soot flows from the burner toward the mandrel. In addition, a shield 86, which is spaced a short distance from face 78 by brackets 88, protects the soot stream from ambient air currents and improves laminar flow.

Figure 8:
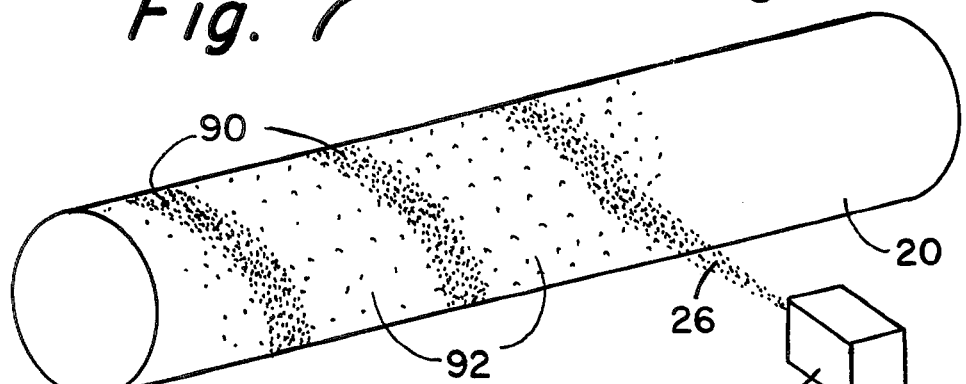
FIG. 8 is a schematic illustration of the application of a first layer of glass particles to a mandrel under conventional conditions.

In accordance with one embodiment of the method disclosed in my aforementioned copending application, a stratum 16 of silica soot is initially deposited on the mandrel to create a compressive layer at the aperture forming surface of the resultant consolidated glass preform. For certain soot compositions including pure silica, conventional soot deposition techniques result in the formation of a devitrified layer on the aperture-forming surface of the resultant glass preform during the consolidation process. The tendency for the apture-forming surface to devitrify is initially manifested by the formation of a white spiral 90 on the mandrel surface as the soot is being deposited thereon as illustrated in FIG. 8 by a dense dot pattern. The spiral pattern is a manifestation of a variation in the density of the deposited soot. Spiral pattern 90 is formed along the spiral path along which the center of focussed soot stream 26 is directed as mandrel 20 rotates and axially translates with respect to burner 24. As illustrated by the sparse dot pattern in the regions 92 between the visible spiral, some soot particles deposit with much lower density in those regions. It is thought that this variable density in the soot layer, which forms the surface of the preform aperture upon removal of the mandrel, causes devitrification sites which initiate devitrification during consolidation of the soot preform. After consolidation has occurred, the entire aperture-forming surface of the preform has a white, frosty appearance while the remainder of the preform is transparent. If such a devitrified layer exists in the preform, a fiber drawn therefrom will contain seeds unless the layer is removed from the aperture-forming surface prior to the time that the aperture is closed.

Figure 9:
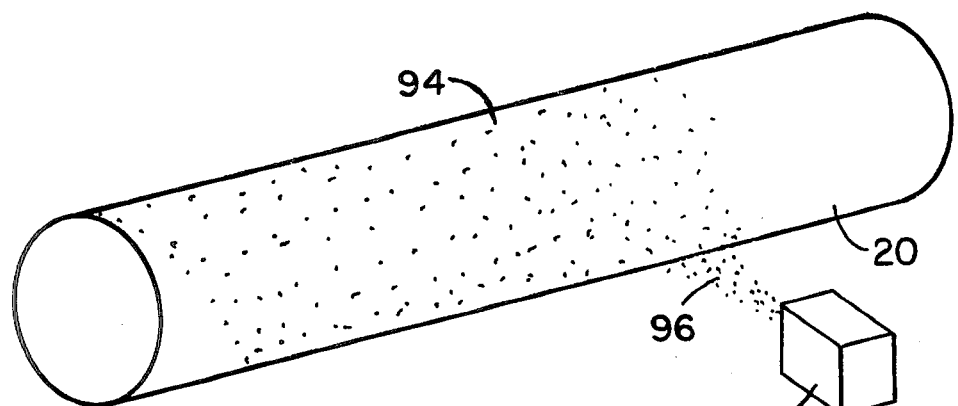
FIG. 9 is a schematic illustration of the application of a first layer of soot particles to a mandrel in accordance with the method of the present invention.

The method of the present invention is characterized in that it comprises depositing the first plurality of layers of glass soot on the mandrel at a deposition rate that is sufficiently low that no spiral pattern of deposited soot is visible. For purposes hereof a layer is defined as that portion of a glass soot preform that is formed by the soot which is deposited by one pass of the burner along the mandrel. The method of the present invention is illustrated in FIG. 9 wherein the first pass of burner 24 along mandrel 20 results in the deposition of a layer 94 of soot which is so fine that hardly any glass soot can be seen. After many layers are deposited, the fine soot stratum becomes continuous. Although more than 50 burner passes were actually employed in the deposition of the fine soot layer in the example described hereinbelow, the actual number of passes could deviate widely from that number without departing from the scope of the invention. For example, the initially deposited fine soot stratum can be made much thicker than the minimum thickness required to prevent devitrification, but this would decrease the amount of glass deposited per unit time and thus increase cost of production. If the deposition of fine soot stratum is not continued for a time sufficient to render it continuous, the application of conventionally applied soot coatings on the discontinuous stratum may still result in devitrification.

Deposition of a fine, spiral-free coating 94 has been achieved by supplying the burner with a greatly reduced flow of reactant vapors. The absence of a high velocity reactant vapor stream emanating from orifice 76 tends to generate a defocused soot stream 96 that is incapable of depositing a layer of soot having a sufficient density variation to appear as a spiral.

Figure 10:
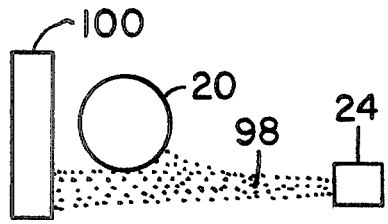
FIG. 10 is a schematic illustration of a technique for applying a fine layer of soot particles to a mandrel.

Various other techniques may be employed to deposit a fine soot stratum of uniform density. A focused soot stream 98 can be directed above or preferably below the mandrel 20 as illustrated in FIG. 10. The major portion of soot stream 98 flows past the mandrel and is collected by exhaust hood 100. Just the soot at the edge of the focused stream impinges upon the mandrel. Buoyant effects cause more of the soot particles to depart upwardly from the focused stream. After the fine soot stratum has been built up to sufficient thickness, the focused soot stream can be directed toward the mandrel for efficient deposition of the remainder of the preform.

Figure 11:
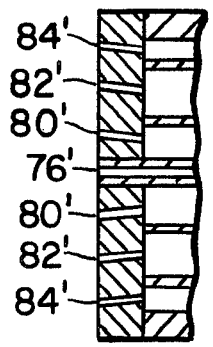
FIG. 11 is a fragmentary cross-sectional view of a modified flame hydrolysis burner which may be employed to generate a diffuse stream of soot particles.

Another technique for depositing a fine soot stratum employs a burner of the type illustrated in FIG. 11 wherein elements similar to those of FIG. 7 are represented by primed reference numerals. The axis of each of the orifices 80', 82' and 84' makes an angle with the axis of orifice 76'. Since the streams issuing from orifices 80', 82' and 84' diverge from that issuing from orifice 76', a diffuse soot stream is produced by the burner of FIG. 11. After the unfocused soot stream is employed for a sufficient time to build up a continuous layer, a conventional burner such as that illustrated in FIG. 7 is employed to efficiently deposit the remainder of the preform.

Referring again to FIG. 1, a first coating 22 of glass soot is deposited on stratum 16. A second coating 28 of soot may be applied over the outside peripheral surface of first coating 22 as shown in FIG. 2. Each of the coatings 22 and 28 is generally formed of a plurality of layers. In accordance with well-known practice the refractive index of coating 28 is made lower than that of coating 22 by changing the composition of the soot being produced in flame 26. This can be accomplished by changing the concentration or type of dopant material being introduced into the flame, or by omitting the dopant material. Mandrel 20 is again rotated and translated to provide a uniform deposition of coating 28. The composite structure including stratum 16, first coating 22 and second coating 28 constitutes porous preform 30.

In the manufacture of optical waveguides, the materials of the core and cladding of the waveguide should be produced from a glass having minimum light attenuation characteristics, and although any optical quality glass may be used, fused silica is a particularly suitable glass. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the refractive index thereof. For example, if pure fused silica is used as the cladding glass, the core glass can consist of fused silica doped with a material to increase its refractive index.

Many suitable materials have been used as a dopant alone or in combination with each other to increase the refractive index of fused silica. These include, but are not limited to, titanium oxide, tantalum oxide, aluminum oxide, lanthanum oxide, phosphorus oxide and germanium oxide. A core of germania doped fused silica is advantageously employed as a fiber core material since the resultant fiber exhibits low loss characteristics which extend to around 1600 The cladding may be pure fused silica or silica doped with an oxide the amount of which is such that the cladding refractive index is lower than that of the core. The cladding could be doped with an oxide such as boron oxide which provides a refractive index slightly lower than that of pure fused silica and also gives the cladding layer a somewhat higher thermal coefficient of expansion than pure fused silica, thereby providing a better match between the coefficients of expansion of the core and cladding materials.

After deposition of particulate soot material to the extent required to form preform 30, mandrel 20 may be removed from the assembly by pulling it out through handle 10, thereby leaving a longitudinal aperture. Integral handle 10 provides a support for subsequent handling and processing.

The ground glass joint portion of handle 10 is secured into a complimentary female ground glass joint member, whereby drying gas may be flowed through handle 10, into the preform aperture and outwardly through the preform interstices. The steps of drying and consolidating may be performed in accordance with the teachings of U.S. Pat. No. 4,125,388, which patent is hereby expressly incorporated by reference. As taught by said patent, drying may be accomplished before or during the consolidation step.

Drying can be facilitated by inserting a short section of capillary tubing 34 into that end of the porous preform aperture opposite handle 10 as shown in FIG. 3. The capillary tubing initially permits some of the drying gas to flush water from the central region of the preform. As the porous preform is inserted into the consolidation furnace, the capillary tubing aperture closes, thereby causing all drying gas to thereafter flow through the preform interstices.

After consolidation, the preform aperture will be closed at end 44 as shown in FIG. 4 due to the presence of the aforementioned capilliary plug. If no plug is employed the entire aperture will remain open. In this event end 44 is closed after consolidation by a technique such as heating and pinching the same. The aperture is then evacuated through handle 10, and the other end 48 is heated and closed. The resultant article can be stored while awaiting further processing without risk of contaminating the aperture-forming wall.

If the resultant consolidated preform is drawn directly into an optical waveguide fiber, the low pressure within the aperture will assist in the closing thereof. Alternatively, the resultant preform may be provided with additional cladding material prior to drawing the optical waveguide fiber. Various well known techniques are available for providing additional cladding material. For example, it may be added by a flame oxidation process as taught in U.S. Pat. No. 3,775,075 or the consolidated preform may be inserted into a tube of cladding material, the composite being drawn into an optical waveguide fiber. If additional cladding is to be provided, it is preferred that the consolidated preform be first drawn into an intermediate, large diameter fiber which is thereafter provided with additional cladding.

The intermediate fiber can be formed in a conventional draw furnace wherein the tip of the consolidated preform from which the intermediate fiber is being drawn is heated to a temperature which is slightly lower than the temperature to which the preform would be subjected to draw optical fiber therefrom. A temperature of about 1900° C. is suitable for a high silica content preform. A suitable method for forming an intermediate fiber is illustrated in FIG. 5. Preform 40 is mounted in a conventional draw furnace where the tip thereof is heated by resistance heater 52. A glass rod 54 may be attached to the bottom of preform 40. A cord 60 is tied to rod 54. Cord 60 is wound upon a motor-driven capstan 62, thereby causing the intermediate fiber 56 to be drawn at a suitable rate, a rate of 15 to 23 cm/min having been found to be adequate. As the intermediate fiber is drawn, the aperture readily closes since the pressure therein is low relative to ambient pressure. The aperture may close somewhat flat whereby the core roundness of the resultant fiber may be adversely affected. The core of the resultant fiber will not be unacceptably out of round if the core-clad ratio of intermediate fiber 56 is sufficiently high and if the intermediate fiber is employed as the central region upon which additional cladding is added in the formation of a single-mode or a multimode fiber. The diameter of an intermediate fiber that is to be employed as a mandrel upon which cladding soot is to be deposited is preferably in the range of 4 to 10 mm. It is noted that core roundness should be satisfactory even if the preform 40 is drawn directly into an optical fiber, provided that the core-clad diameter ratio of the resultant fiber is sufficiently high.

That aspect of the invention whereby the final draw blank is formed in a two-step process involving the formation of an intermediate fiber results in less tensile stress in the inner core region of the consolidated preform. The ratio of the core diameter to cladding diameter in preform 40 is larger than the value necessary to achieve the desired core diameter in the resultant fiber. When intermediate fiber 56 is formed, aperture 42 closes, thereby burying the surface at which breakage would have been initiated.

The following specific example illustrates the manner in which the method of the present invention can be employed to produce an optical waveguide fiber. An integral handle of the type disclosed in U.S. Pat. No. 4,289,522 was employed. A tapered alumina mandrel was inserted into the handle, the central region where soot particles were ultimately deposited being tapered from about 5.5 mm to 6.5 mm.

A burner of the type illustrated in FIG. 7 was located 13.7 cm from the mandrel. During the deposition of the entire preform, oxygen flowed from inner shield orifices 80 and outer shield orifices 84 at 2.5 slpm (standard liters per minute) and 3.0 slpm, respectively. During the formation of stratum 16, methane and oxygen flowed from orifices 82 at 6.5 slpm and 5.2 slpm, respectively. During the formation of coatings 22 and 28, the flow of methane and oxygen from orifices 82 was 5.8 slpm and 4.1 slpm, respectively.

Liquid $SiCl_4$ and liquid $GeCl_4$ was maintained at 37° C. in first and second containers, respectively. The burner traversed a 49 cm section of mandrel in 25 seconds. An acetylene torch supported on the burner was first employed to deposit carbon particles on the mandrel during one burner pass. Silica soot was then deposited on the mandrel for thirty minutes during which time oxygen flowed through the first container at a rate of 0.05 slpm to form a layer of low expansion silica soot having a thickness of about 1 mm.

During the next two hours oxygen was bubbled through the second container at a rate of 0.3 slpm while the flow rate of oxygen to the first container was increased to 1.4 slpm. Thus, a step-index core region of SiO$_2$ doped with 10 weight percent GeO$_2$ was deposited to a thickness of about 12 mm. The flow of oxygen to the second container was then stopped while the rate of oxygen flow to the first container remained at 1.4 slpm for 270 minutes during which time SiO$_2$ soot was deposited to form the cladding region of the soot preform, the outer diameter of which was 70 mm.

The soot preform was removed from the lathe, and the mandrel was removed therefrom, the integral handle remaining at one end thereof. A short section of capillary tubing was inserted into that end of the preform aperture opposite the handle. The preform was then simultaneously dryed and consolidated in accordance with the teachings of U.S. Pat. No. 4,125,388. A drying gas consisting of 5 volume percent chlorine, the balance being helium, was flowed through the handle and into the preform aperture. A portion of this drying gas initially flowed through the capillary plug carrying with it water vapor along with reaction products from the drying reaction. As the preform was lowered into the consolidation furnace, through which a helium flushing gas was flowing, the opening in the capillary tube became sealed, and the preform was subjected to gradient consolidation.

The consolidated preform was then inserted into a lathe and the aperture was evacuated through the handle. When the flame from a small torch was directed at the central region of the handle portion the aperture was quickly drawn shut to form pinched region 48.

The preform was then inserted into a draw furnace, and a cord was attached thereto. The bottom tip of the preform was heated to about 1900° C. while the cord pulled downwardly on the preform at a rate of about 15 cm/min. The diameter of the resultant intermediate fiber was about 5 mm. After the intermediate fiber had been drawn to a length of about 3 m, it was broken from the preform and severed into sections about 89 cm long. The cord was reattached to the bottom of the undrawn portion of the preform, and the remainder of the preform was drawn into intermediate fiber.

Each of the sections of intermediate fiber was then subjected to the following steps. A section of intermediate fiber was supported in the lathe where it functioned as a mandrel for the deposition of cladding soot. Oxygen flowed through the first container at a rate of 1.6 slpm, and the burner traversed the intermediate fiber at a rate of about 2 cm/sec. This was continued until a layer of SiO$_2$ having an outside diameter of 60 mm was deposited.

Figure 12:
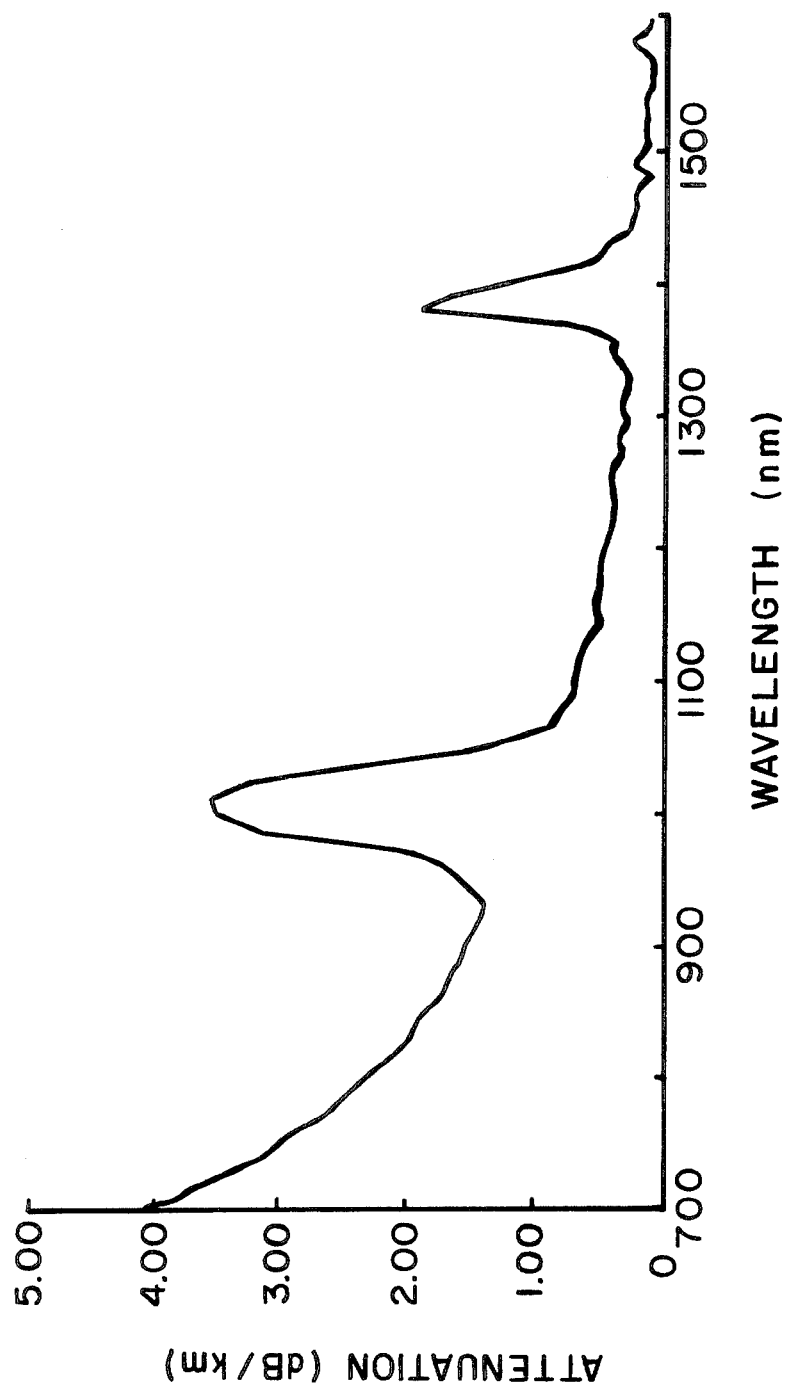
FIG. 12 is a spectral attenuation curve of an optical waveguide fiber formed in accordance with the method of the present invention.

The resultant final preform was gradually inserted into a consolidation furnace having a maximum temperature of 1450° C. where it was consolidated while a mixture of 99.5 volume percent helium and 0.5 volume percent chlorine flowed upwardly through the furnace. The resultant optical waveguide preform, the diameter of which was about 35 mm, was inserted into the draw furnace where the tip thereof was subjected to a temperature of about 2100° C. The preform was drawn to form a step-index, single-mode optical waveguide fiber having a core diameter of about 8 μm. The spectral attenuation curve for this fiber is shown in FIG. 12. The peaks at about 950 nm and 1400 nm are indicative of a water content of about 3 ppm. The attenuation at 1480 nm is shown to be less than 0.1 dB/km.

The following experiments were performed to ascertain the effect of varying reactant flow to the flame hydrolysis burner. With all other conditions remaining the same as those specified in the above example, the oxygen carrier gas flow to the SiCl$_4$ reservoir was set at four different levels during the formation of stratum 16 while four preforms were being fabricated.

The oxygen carrier flow rate for the first preform was set at the level of 1.44 slpm, which is in the range of conventional flow rates for achieving efficient deposition of soot. Thereafter coatings 22 and 28 of core and cladding soot were applied as described above. After the resultant preform was consolidated, devitrification manifested by a frosty appearance was evident along the entire length of the aperture.

During the fabrication of the second preform, the carrier gas flow rate to the SiCl$_4$ reservoir was 0.2 slpm while stratum 16 was being deposited. After depositing coatings 22 and 28 and consolidating the resultant soot preform, a pattern of devitrification spirals were evident along the length of the blank.

The oxygen carrier gas flow rate for the third preform was set at 0.1 slpm during the deposition of stratum 16. Thereafter, coatings 22 and 28 were deposited and the soot preform was consolidated. Most of the resultant consolidated preform was acceptable for the formation of optical waveguide fibers since there was no evidence of devitrification spirals along the aperture-forming surface. However, the end of the aperture-forming surface opposite the handle contained a layer of devitrified glass. This portion of the preform would have to be removed prior to further processing.

During the fabrication of the fourth preform, the flow rate of carrier gas to the SiCl$_4$ reservoir was 0.02 slpm during the formation of stratum 16. After depositing coatings 22 and 28 and consolidating the resultant soot preform, there was no evidence of devitrification on the aperture-forming surface of the preform. Thus, the entire preform would be suitable for the formation of optical waveguide fibers.

The above described method is merely illustrative of the present invention, and various modifications can be made thereto without departing from the scope of the invention. For example, in the preferred embodiment described herein the soot flow rate was reduced during the deposition of the entire silica compressive stratum 16. Alternatively, the soot flow rate could be reduced during the deposition of only the first plurality of layers of silica stratum 16, provided that the thickness of that initially formed portion is sufficient to prevent the occurrence of devitrification, that is, provided that a continuous coating is formed by the first plurality of layers of fine soot.

The effect of the fine soot stratum, i.e. the elimination of devitrification at the aperture-forming surface of the consolidated preform, is not limited to SiO$_2$ coatings. Strata of silica doped with 15 wt. % GeO$_2$ as well as pure silica have both been effective in preventing devitrification. If either of these soot compositions were deposited at normal rates, devitrification would occur during consolidation.

I claim:
1. A method of forming a high purity glass article comprising the steps of:
   providing a substantially cylindrical mandrel,
   rotating said mandrel,
   directing at least a portion of a stream of glass particles toward said mandrel, reciprocatingly moving said stream longitudinally with respect to said mandrel to build up a coating of said glass particles on said mandrel, removing said mandrel to form a tubular porous glass preform, and consolidating said porous glass preform to form a tubular glass article, the improvement comprising depositing the first plurality of layers of glass particles on the surface of said mandrel at a deposition rate that is sufficiently low that no spiral pattern of deposited glass particles is visible, whereby the aperture forming surface of said tubular glass article is free from devitrification.

2. The method of claim 1 wherein one end of said aperture is closed during consolidation, said method further comprising the steps of evacuating said aperture and closing the remaining end of said aperture.

3. The method of claim 2 further comprising the steps of heating at least one end of said consolidated preform and drawing to close said aperture and reduce the diameter of said consolidated preform.

4. The method of claim 3 wherein the step of drawing is characterized in that it comprises drawing an intermediate, large diameter fiber, said method further comprising the step of adding cladding material to said intermediate fiber and drawing the resultant composite article to form an optical waveguide fiber.

5. The method of claim 4 wherein the step of adding cladding material comprises inserting said intermediate fiber into a tube of cladding glass.

6. The method of claim 2 wherein the step of drawing comprises drawing said preform to an intermediate fiber having a thickness sufficient that it can be employed as a mandrel upon which particulate glass can be deposited, said method further comprising the steps of depositing a layer of particulate cladding glass on at least a portion of said intermediate fiber.

7. The method of claim 1 wherein, prior to the step of consolidating, said method comprises inserting a capillary tube into one end of said aperture and flowing a drying gas into the remaining end of said aperture, said capillary tube closing during the step of heating.

8. Method of forming an optical fiber preform by depositing consecutive layers of glass particles on a mandrel to build up one or more coatings thereon, removing the mandrel, and heating the resultant porous preform to form a consolidated glass preform, the composition of the first applied layers being such that the aperture-forming surface of the preform devitrifies during consolidation when said first applied layers are deposited in a conventional manner by directing a focused stream of glass particles at the preform, the improvement comprising applying the first plurality of layers of glass particles by directing a diffuse stream of particles at the mandrel, the resultant particle deposit being so fine that no spiral pattern of particles is visible after the first layer is deposited, the deposition of layers by said diffuse stream being continued at least until a continuous stratum has been built up on said mandrel.

9. A method of forming a high purity glass article comprising the steps of:

providing a substantially cylindrical mandrel, rotating said mandrel, directing toward said mandrel stream of glass particles having a relatively low coefficient of expansion, reciprocatingly moving said stream longitudinally with respect to said mandrel to build up a stratum of particulate glass having a relatively low coefficient of expansion, the deposition rate during at least the first plurality of cycles of reciprocation of said stream with respect to said mandrel being sufficiently low that no helical pattern of deposited glass particles is visible, applying a first coating of particulate glass to the outside peripheral surface of said stratum, the coefficient of expansion of said first coating being greater than that of said stratum, applying a second coating of particulate glass over the outside peripheral surface of said first coating, said second coating having a refractive index less than that of said first coating, removing said mandrel to form a porous preform having an aperture therein, heating said porous preform to form an elongated, consolidated glass preform having a longitudinal aperture therethrough, the aperture-forming surface of said consolidated preform being free from devitrification, closing one end of said aperture, evacuating said aperture, closing the remaining end of said aperture, heating at least one end of said consolidated preform and drawing to close said aperture and reduce the diameter of said consolidated preform, thereby forming a large diameter, intermediate fiber, adding cladding material to said intermediate fiber, and drawing the composite article so formed into an optical waveguide fiber.

10. The method of claim 9 wherein the step of directing comprises directing a stream of particles of silica.

11. The method of claim 10 wherein the step of adding cladding material comprises depositing a layer of particulate cladding glass on at least a portion of said intermediate fiber, and consolidating said layer of particulate cladding glass on the surface of said intermediate fiber.

12. The method of claim 1 wherein the step of directing a stream of glass particles comprises providing a flame hydrolysis burner and feeding thereto a stream of oxygen and an amount of $SiCl_4$ vapor no greater than that amount which would be entrained in a stream of oxygen bubbled at a rate no greater than 0.05 slpm through a reservoir of $SiCl_4$ that is maintained at 37° C.

13. The method of claim 8 wherein the step of applying the first plurality of layers of glass particles comprises providing a flame hydrolysis burner and feeding thereto a stream of oxygen and an amount of $SiCl_4$ vapor no greater than that amount which would be entrained in a stream of oxygen bubbled at a rate no greater than 0.05 slpm through a reservoir of $SiCl_4$ that is maintained at 37° C.

* * * * *